US009781195B2

United States Patent
Ahn et al.

(10) Patent No.: US 9,781,195 B2
(45) Date of Patent: Oct. 3, 2017

(54) METHOD AND DEVICE FOR PERFORMING REMOTE TASK USING GUEST DEVICE

(71) Applicant: SAMSUNG ELECTRONICS CO., LTD., Suwon-si, Gyeonggi-do (KR)

(72) Inventors: Jin-hyeong Ahn, Suncheon-si (KR); Kyung-ah Chang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/885,033

(22) Filed: Oct. 16, 2015

(65) Prior Publication Data

US 2016/0119410 A1    Apr. 28, 2016

(30) Foreign Application Priority Data

Oct. 24, 2014   (KR) .................. 10-2014-0145397

(51) Int. Cl.
*H04B 7/00*    (2006.01)
*H04L 29/08*   (2006.01)

(52) U.S. Cl.
CPC .......... *H04L 67/10* (2013.01); *H04L 67/025* (2013.01); *H04L 67/04* (2013.01); *H04L 67/12* (2013.01)

(58) Field of Classification Search
CPC ........ H04L 67/10; H04W 24/10; H04W 88/02
USPC .............................. 455/41.1, 41.2, 41.3, 500
See application file for complete search history.

(56) References Cited

U.S. PATENT DOCUMENTS

| 8,805,947 | B1* | 8/2014 | Kuzkin | G06F 9/547 |
| | | | | 709/208 |
| 9,002,930 | B1* | 4/2015 | Want | H04L 29/04 |
| | | | | 709/203 |
| 9,041,735 | B2* | 5/2015 | Choi | G06F 3/0481 |
| | | | | 345/2.1 |
| 9,251,384 | B1* | 2/2016 | Potlapally | G06F 21/85 |
| 9,467,494 | B1* | 10/2016 | Mahalingaiah | H04L 67/02 |
| 2010/0317317 | A1* | 12/2010 | Maier | H04W 64/00 |
| | | | | 455/404.2 |
| 2011/0111697 | A1* | 5/2011 | Lazaridis | H04M 1/7253 |
| | | | | 455/41.2 |
| 2012/0173730 | A1* | 7/2012 | Krumpe, Jr. | G06F 9/5072 |
| | | | | 709/226 |
| 2013/0052946 | A1* | 2/2013 | Chatterjee | H04W 4/008 |
| | | | | 455/41.1 |
| 2013/0095849 | A1* | 4/2013 | Pakzad | H04W 64/00 |
| | | | | 455/456.1 |
| 2013/0166684 | A1* | 6/2013 | Park | H04L 67/306 |
| | | | | 709/217 |

(Continued)

FOREIGN PATENT DOCUMENTS

KR   10-2012-0065674   6/2012
KR   10-1230923       2/2013

*Primary Examiner* — M D Talukder
(74) *Attorney, Agent, or Firm* — Nixon & Vanderhye, P.C.

(57) ABSTRACT

A method whereby a host device accesses a remote server and performs a task is disclosed, the method including receiving a task command regarding the remote server; searching for a guest device capable of communicating with the host device and the remote server; determining a task performing pattern based on a found guest device and details of the task; and, according to the determined task performing pattern, performing the task via the host device and one or more devices selected from among found guest devices.

12 Claims, 10 Drawing Sheets

(56) References Cited

U.S. PATENT DOCUMENTS

| | | | |
|---|---|---|---|
| 2013/0286942 A1* | 10/2013 | Bonar | H04B 7/0689 370/328 |
| 2013/0331028 A1* | 12/2013 | Kuehnel | H04W 76/02 455/41.1 |
| 2014/0274123 A1* | 9/2014 | Nixon | G05B 11/01 455/456.1 |
| 2014/0282015 A1* | 9/2014 | Nixon | G05B 11/01 715/733 |
| 2014/0324410 A1* | 10/2014 | Mathews | G09B 25/00 703/22 |
| 2014/0344806 A1* | 11/2014 | Suresh | G06F 9/4445 718/1 |
| 2015/0163269 A1 | 6/2015 | Ryu | |
| 2015/0300892 A1* | 10/2015 | Malhotra | G01K 13/00 700/276 |
| 2015/0358810 A1* | 12/2015 | Chao | H04W 4/001 455/418 |
| 2016/0087928 A1* | 3/2016 | Soldner | H04L 51/10 709/206 |
| 2016/0119410 A1* | 4/2016 | Ahn | H04L 67/10 455/500 |

\* cited by examiner

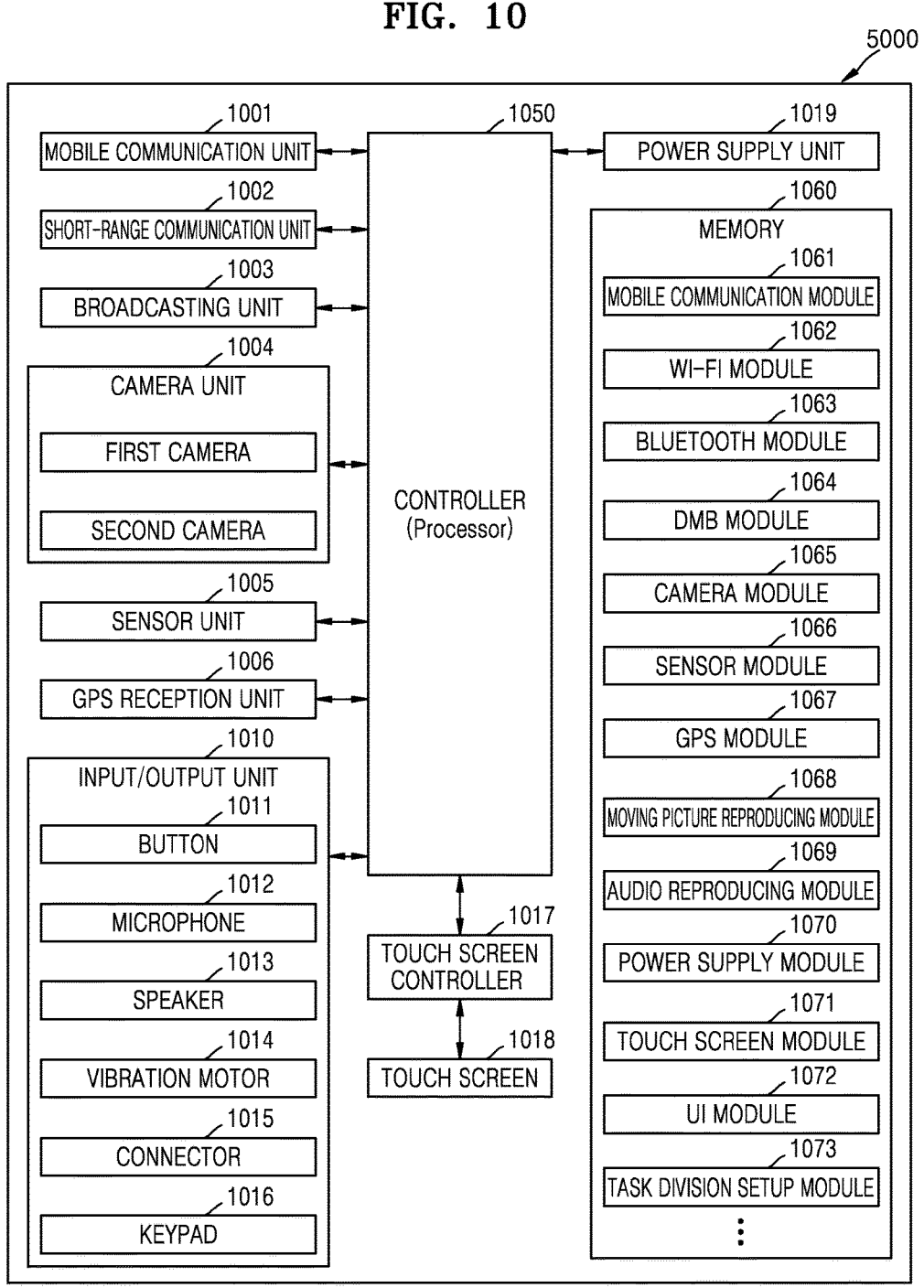

METHOD AND DEVICE FOR PERFORMING REMOTE TASK USING GUEST DEVICE

CROSS-REFERENCE TO RELATED APPLICATION

This application is based on and claims priority under 35 U.S.C. §119 to Korean Patent Application No. 10-2014-0145397, filed on Oct. 24, 2014, in the Korean Intellectual Property Office, the disclosure of which is incorporated by reference herein in its entirety.

BACKGROUND

1. Field

The disclosure relates to a method and a device for performing a remote task.

2. Description of Related Art

As the Internet network has become widely popularized among general consumers based on developments in communication technologies, various types of services using the Internet are being developed. Recently, based on the popularization of personal devices like smart phones, environments for accessing the Internet regardless of time and location have been established.

As such Internet accessing environments are established, cloud storage services are recently introduced. In cloud storage services, contents, e.g., movie files, picture files, music files, media files, document files, and address book files, may be stored in cloud storage.

A cloud storage service enables access to files stored in cloud storage by using personal terminals, such as a smart phones or a personal computers (PCs), at anytime and from anywhere. Furthermore, as the number of cloud storage service providers increases, a user may use a plurality of cloud storage services at the same time. Each cloud storage service provider provides an application for accessing its cloud storage.

Therefore, a change and a need of a user with respect to performing various data processing operations while using one or more remote storage spaces is increasing. However, if a network status is unstable, it may be inconvenient to access remote data.

SUMMARY

A method and a device for performing a remote task at an improved speed using a guest device are provided.

Additional aspects will be set forth in part in the description which follows and, in part, will be apparent from the description.

According to an aspect of an example embodiment, a method whereby a host device accesses a remote server and performs a task, includes receiving a task command regarding the remote server; searching for a guest device capable of communicating with the host device and the remote server; determining a task performing pattern based on the found guest device and details of the task; and, based on the determined task performing pattern, performing the task via the host device and one or more devices selected from among the found guest devices.

The guest device may be registered to the host device in advance.

The guest device may be capable of communicating with the remote server via a wire and may be capable of wirelessly communicating with the host device via, for example, a short-range wireless communication technique.

The task performing pattern includes a pattern wherein the host device alone performs the task, a pattern wherein one or more of the guest devices from among the found guest devices performs the task in place of the host device, or a pattern wherein the host device and one or more of the guest devices from among the found guest devices divide, allocate and perform the task.

Determining the task performing pattern may include measuring network performance of the host device; and measuring respective network performances of the found guest devices.

Determining the task performing pattern may further include measuring a battery condition of the host device.

Determining the task performing pattern may further include selecting a guest device to allocate at least a portion of the task from among the found guest devices.

Determining the task performing pattern may further include determining a task allocation ratio between the host device and the selected guest device.

The task allocation ratio between the host device and the selected guest device may be determined to be proportional to the measured network performance.

The method may further include transmitting signals requesting that the selected guest devices perform portions of the task allocated thereto.

The method may further include receiving results of performing the allocated portions of the task from the selected guest devices.

The task may include uploading data from the host device to the remote server, downloading data from the remote server to the host device, moving data from the remote server to another remote server, or executing content stored in the remote server on the host device.

According to an aspect of another example embodiment, a device includes a memory, in which at least one program is stored; and a processor, which executes the at least one program to perform a task with respect to a remote server by utilizing a guest device, wherein the at least one program includes commands for executing: receiving a task command regarding the remote server; searching for a guest device capable of communicating with the host device and the remote server; determining a task performing pattern based on the found guest device and details of the task; and, based on the determined task performing pattern, performing the task via the host device and one or more devices selected from among the found guest devices.

The at least one program may further include commands for executing measuring network performance of the host device; and measuring respective network performances of the found guest devices, in the determining of the task performing pattern.

The at least one program may further include commands for executing measuring a battery condition of a device.

The at least one program may further include commands for executing selecting a guest device from among the found guest devices to allocate at least a portion of the task.

The at least one program may further include commands for executing determining a task allocation ratio between the host device and the selected guest device.

The task allocation ratio between the host device and the selected guest device may be determined to be proportional to the measured network performance.

The at least one program may further include commands for executing transmitting signals for requesting that the selected guest devices perform portions of the task allocated thereto.

The at least one program may further include commands for receiving results of performing the allocated portions of the task from the selected guest devices.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein:

FIG. 10 is a block diagram illustrating an example device.

DETAILED DESCRIPTION

Figure 1:
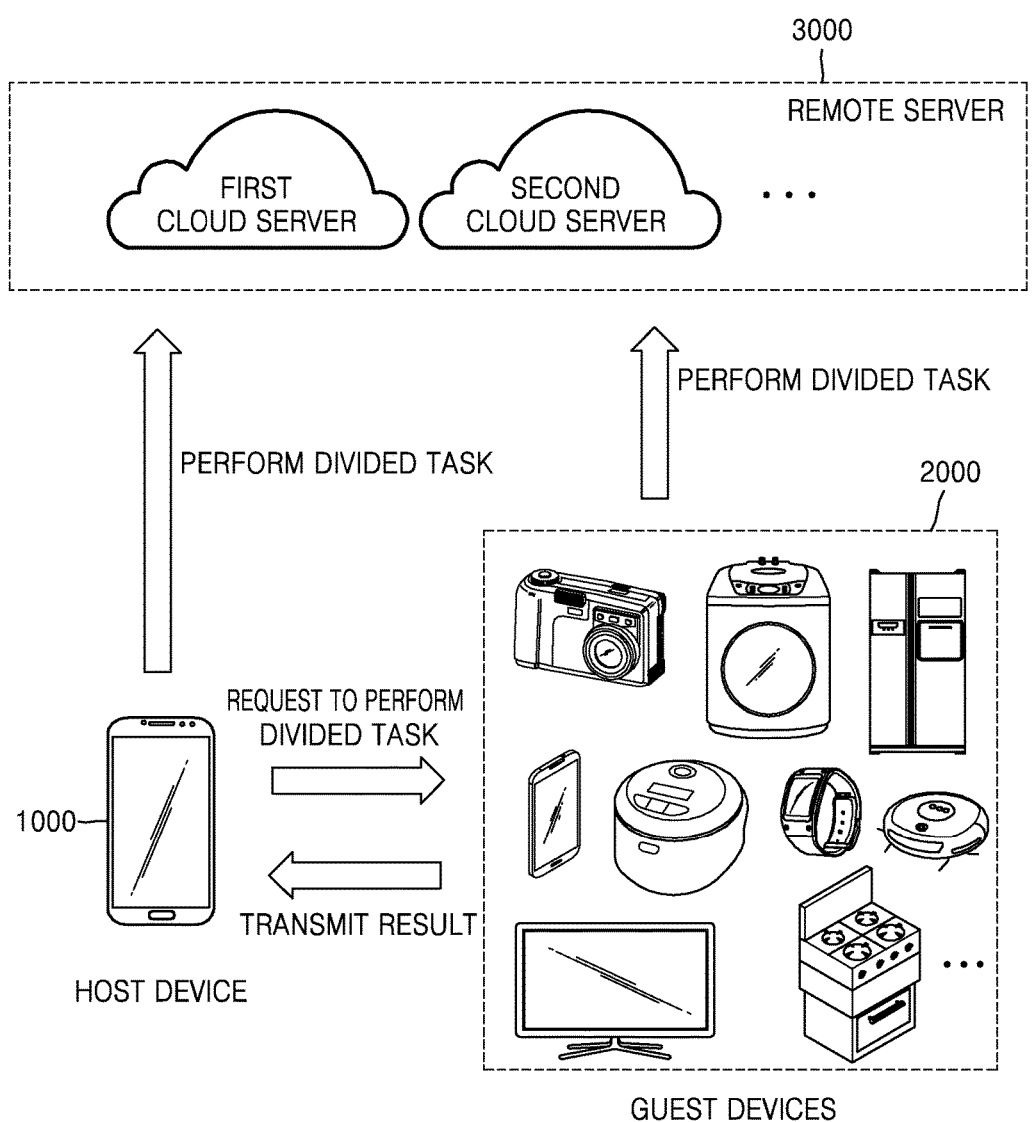
FIG. 1 is a diagram illustrating an example method whereby a host device performs a remote task by using a guest device.

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not necessarily modify the individual elements of the list.

As the disclosure allows for various changes and numerous examples, particular examples will be illustrated in the drawings and described in detail in the disclosure. However, this is not intended to limit the disclosure to particular modes of practice, and it is to be appreciated that all changes, equivalents, and substitutes that do not depart from the spirit and technical scope of the disclosure are encompassed in the disclosure. In the disclosure, certain detailed explanations of the related art are omitted when it is deemed that they may unnecessarily obscure the essence of the disclosure.

While such terms as "first," "second," etc., may be used to describe various components, such components must not be limited to the above terms. The above terms are used only to distinguish one component from another.

In addition, although the terms used in the disclosure are selected from generally known and used terms, some of the terms mentioned in the disclosure may have been selected by the applicant at his or her discretion, the detailed meanings of which are described in relevant parts of the description herein. Furthermore, is the disclosure may be understood, not simply by the actual terms used but by the meaning of each term lying within.

An expression used in the singular encompasses the expression of the plural, unless it has a clearly different meaning in the context. In addition, unless explicitly described to the contrary, the word "comprise" and variations such as "comprises" or "comprising" will be understood to imply the inclusion of stated elements but not the exclusion of any other elements.

Throughout the disclosure, it will be understood that when a portion is referred to as being "connected to" another portion, it can be "directly connected to" the other portion or "electrically connected to" the other portion via another element.

Furthermore, throughout the disclosure, a connection between two devices refers to a state that the two devices may transmit and receive data to and from each other, where the two devices may be connected to each other via Bluetooth communication, Wi-Fi communication, and near field communication (NFC).

Furthermore, throughout the disclosure, a host device may be the subject of performing a task with respect to a remote server and may store a result of performing the task. For example, a host device may be a device that displays, executes, reproduces, or stores a result of performing a task.

Furthermore, a guest device may be a device that delegates and shares tasks to be performed by a host device, under the control of the host device and may refer to a device that is connected to a host device for performing a certain task. A guest device may, for example, not be able to independently perform a certain task. However, the disclosure is not limited thereto. A guest device may be connected to a host device, receive a control command from the host device, and perform a certain task based on the received control command.

Hereinafter, example embodiments will be described more fully with reference to the accompanying drawings. The example embodiments may, however, be embodied in many different forms and should not be construed as limited to the examples set forth herein. Rather, the example embodiments are provided so that this disclosure will be thorough, and will convey the scope of the disclosure to those of ordinary skill in the art. In the drawings, certain elements are omitted for clarity, and like elements denote like reference numerals throughout the specification.

Hereinafter, examples will be described in detail with reference to accompanying drawings.

FIG. 1 is a diagram illustrating an example method whereby a host device 1000 performs a remote task by using a guest device 2000.

A remote task may, for example, be a task in which the host device 1000 utilizes a storage space of a remote server 3000, e.g., uploading data from the host device 1000 to the remote server 3000, downloading data from the remote server 3000 to the host device 1000, moving data from the remote server 3000 to another remote server 3000, executing content stored in the remote server 3000 on the host device 1000, etc.

The remote server 3000 may, for example, be a server that communicates with various devices, such as, for example, a mobile phone and a tablet personal computer (PC), via a network, and may include a cloud server, such as Google Drive or Dropbox, a web driver, and a File Transfer Protocol (FTP) server, etc., and may include a storage space for storing data of users. The remote server 3000 refers to one or more from among the above-stated devices.

The host device 1000 may, for example, be a device that performs a task with respect to the remote server 3000. For example, the host device 1000 owns a result of performing the task. In other words, the host device 1000 is a device that, for example, displays, executes, reproduces, or stores a result of performing a task.

The host device 1000 may communicate with the remote server 3000 via a wired network or a wireless network. For example, the host device 1000 may communicate with the remote server 3000 via a 3G communication network, a 4G communication network, a Wi-Fi network, or the like. However, the disclosure is not limited thereto. The host device 1000 may, for example, be a smart phone, a mobile phone, a personal digital assistant (PDA), a laptop computer, a media player, a PC, or various other mobile or non-mobile computing devices. However, the disclosure is not limited thereto.

The guest device 2000 is a device capable of performing a certain task with respect to the remote server 3000 based on a control signal from the host device 1000 and may include various electronic devices, such as, for example, household electronic devices and wearable devices. For example, the guest device 2000 may include a TV, an illumination device, a refrigerator, an audio device, a washing machine, an oven, a gas range, a home gateway, a game device, an electronic blackboard, a touch table, a wristwatch, etc. However, the disclosure is not limited thereto. The guest device 2000 does not necessarily refer to all of the devices shown in FIG. 1 and may refer to one or more thereof.

The guest device 2000 may, for example, communicate with the remote server 3000 via a wire or wirelessly. The guest device 2000 may communicate with the host device 1000 via Bluetooth communication, Bluetooth Low Energy (BLE) communication, near field communication (NFC), Wi-Fi (WLAN) communication, Zigbee communication, infrared data association (IrDA) communication, Wi-Fi Direct (WFD), ultra wideband (UWB) communication, Ant+ communication, Wi-Fi communication, etc. However, the disclosure is not limited thereto.

When the host device 1000 performs a certain remote task with respect to the remote server 3000, the remote task may not be smoothly or efficiently performed due to factors including a network condition, a battery condition, and a data capacity of the host device 1000. According to an example embodiment, the host device 1000 may perform a desired task smoothly or more efficiently by utilizing a guest device 2000.

For example, the host device 1000 may divide a task to perform, instruct at least one device selected from among the guest devices 2000 to perform some allocated portion of the divided tasks, and performs the remainder of the divided task. The host device 1000 may select a suitable guest device 2000 in consideration of various conditions regarding the guest device 2000 and the host device 1000, for example, a resource condition of the host device 1000 and types of a task to perform and may request the guest device 2000 to perform a divided task. The selected guest device 2000 may perform an allocated divided task with respect to the guest device 2000 and transmit a result thereof to the host device 1000.

Figure 2:
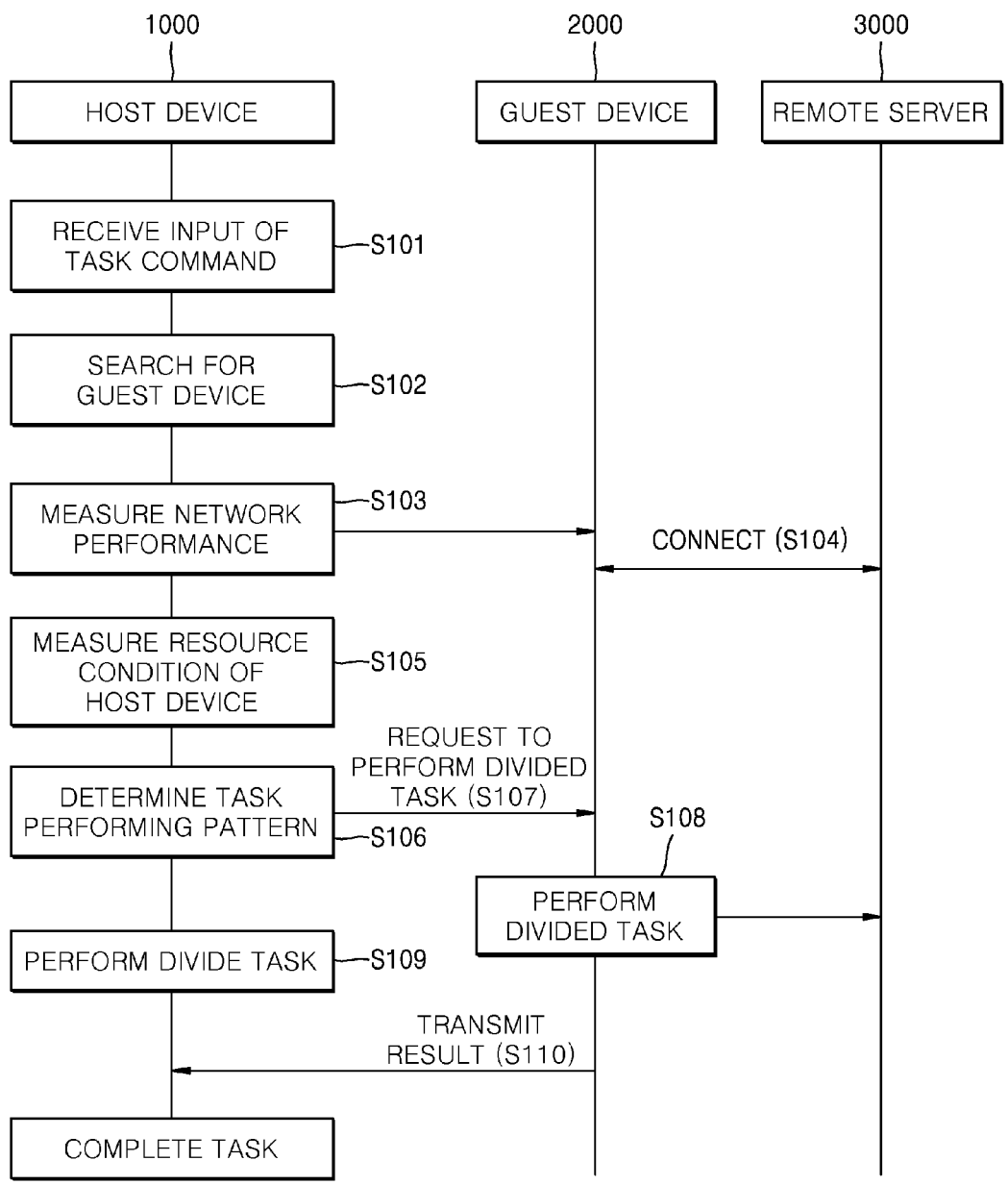
FIG. 2 is a flowchart illustrating an example method whereby the host device performs a remote task utilizing the guest device.

FIG. 2 is a flowchart illustrating an example method whereby the host device 1000 performs a remote task by utilizing the guest device 2000.

The host device 1000 receives an input of a task command regarding the remote server 3000 (operation S101). A task command may, for example, refer to a remote task using the remote server 3000 and may include various operations, such as uploading data from the host device 1000 to the remote server 3000, downloading data from the remote server 3000 to the host device 1000, moving data from the remote server 3000 to another remote server 3000, executing or reproducing content stored in the remote server 3000 on the host device 1000, etc.

The host device 1000 searches for a guest device 2000 capable of communicating with the remote server 3000 (operation S102). The guest device 2000 may be registered to the host device 1000 in advance. The guest device 2000 may be a device capable of communicating with the remote server 3000 via a wire or wirelessly and may wirelessly communicate with the host device 1000 using, for example, a short-range wireless communication technique. However, the disclosure is not limited thereto. For example, the guest device 2000 may include at least one of a TV, an illumination device, a refrigerator, an audio device, a washing machine, an oven, a gas range, a home gateway, a game device, an electronic blackboard, a touch table, a wristwatch, etc.

The host device 1000 determines a task performing pattern based on conditions of the found guest device 2000, conditions of the host device 1000, and details of a task (operation S106). The task is performed by the host device 1000 and one or more devices selected from the found guest devices 2000 based on the determined task performing pattern.

A task performing pattern may, for example, be a pattern whereby the host device 1000 performs the task alone, a pattern whereby one or more of the guest devices 2000 from among the found guest devices 2000 performs the task in place of the host device 1000, or a pattern whereby the host device 1000 and one or more of the guest devices 2000 from among the found guest devices 2000 divide, allocate and perform the task.

To determine a task performing pattern, the host device 1000 may measure a network performance (operation S103). The network performance refers, for example, to network performance of the host device 1000 and respective network performances of the found guest devices 2000. For example, the network performance may refer to network performances between the host device 1000 and the guest devices 2000, network performance between the host device 1000 and the remote server 3000, and network performances between the guest devices 2000 and the remote server 3000. Network performance may be determined by measuring a reaction speed, a bandwidth, a type of data communication (wired, wireless, 3G, 4G, etc.), etc. Network performance may include network speed. For example, network performance may be determined by measuring a data transmission speed from the host device 1000 to the remote server 3000, data transmission speeds from the respective guest devices 2000 to the remote server 3000, and data transmission speeds from the host device 1000 to the respective guest devices 2000.

To measure network performance, the host device 1000 may, for example, be connected to the remote server 3000 and the guest devices 2000. Furthermore, to measure network performances of the guest devices 2000 with respect to the remote server 3000, the host device 1000 may request the guest devices 2000 to be connected to the remote server 3000. After the guest devices 2000 are connected to the remote server 3000 (operation S104), the host device 1000 may measure network performances of the guest devices 2000.

Furthermore, an operation S105 for measuring resource conditions of the host device 1000 may be further performed. The resource conditions of the host device 1000 may, for example, include, a battery condition, remaining wireless data capacity, etc.

Sequences for performing the operation S103 for measuring network performance and the operation S105 for measuring resource conditions of the host device 1000 are not limited to the above-stated sequences and may be switched.

Based on results of the measurements, the host device 1000 determines a task performing pattern (operation S106). A determined task performing pattern may include whether to perform a task alone (e.g., without allocating a portion of the task to a guest device), whether to perform the task jointly, a task allocation ratio, and information regarding guest devices to which to allocate the task. For example, a task allocation ratio between the host device 1000 and the selected guest device 2000 may be determined in proportion to the measured network performance.

The host device 1000 transmits an allocated task requesting signal to the selected guest device 2000 (operation S107), and the guest device 2000 performs an allocated task with respect to the remote server 3000 based on a control signal from the host device 1000 (operation S108). The host device 1000 performs the remaining task (operation S109). The guest device 2000 transmits a result of performing the task to the host device 1000 (operation S110).

Hereinafter, types of tasks to be performed by the host device 1000 and examples in which remote tasks are divided and performed by the host device 1000 and the guest device 2000 under various circumstances will be described.

Figure 3:
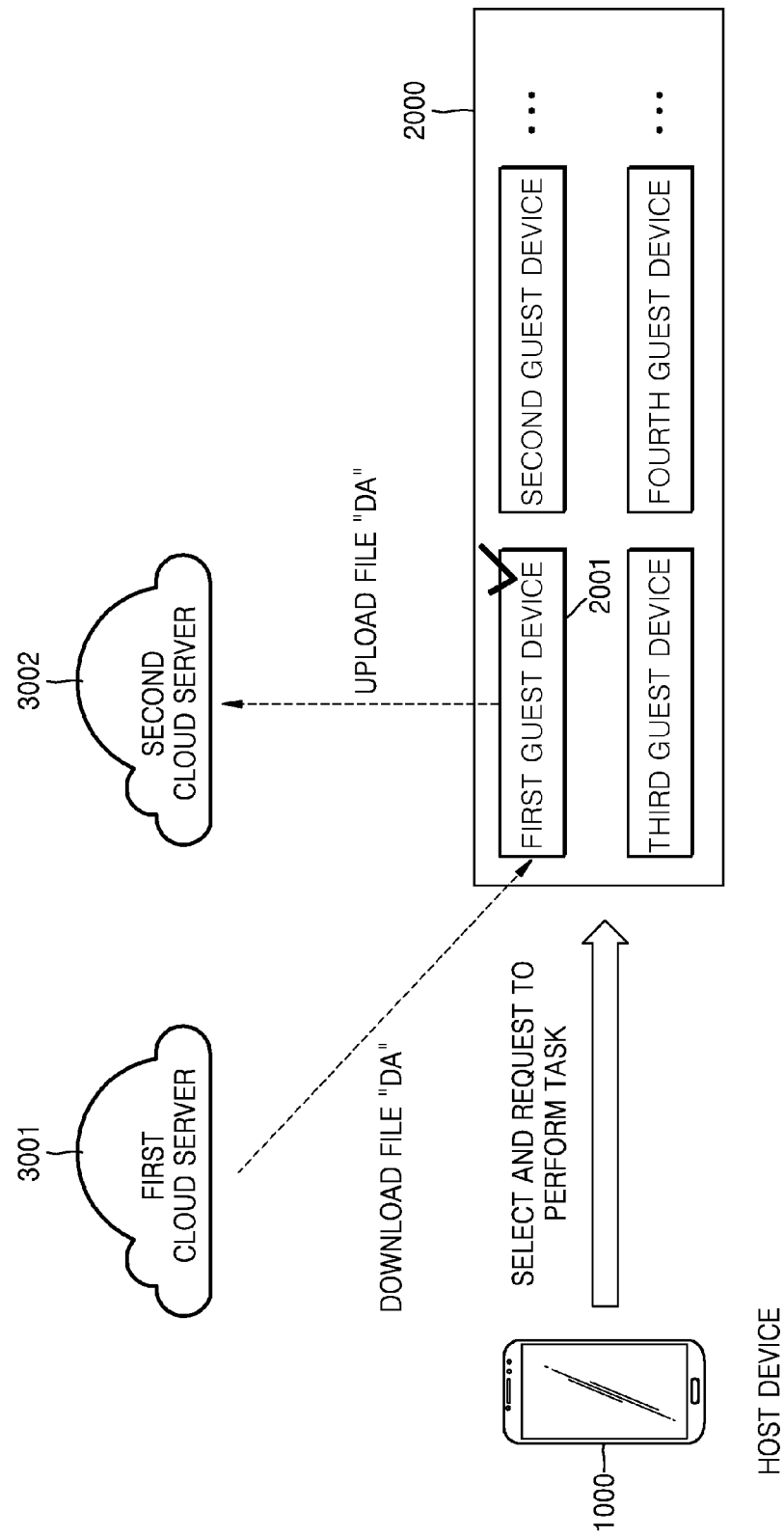
FIG. 3 is a diagram illustrating an example method whereby the host device delegates a task for moving data between remote servers to a guest device.
Figure 4:
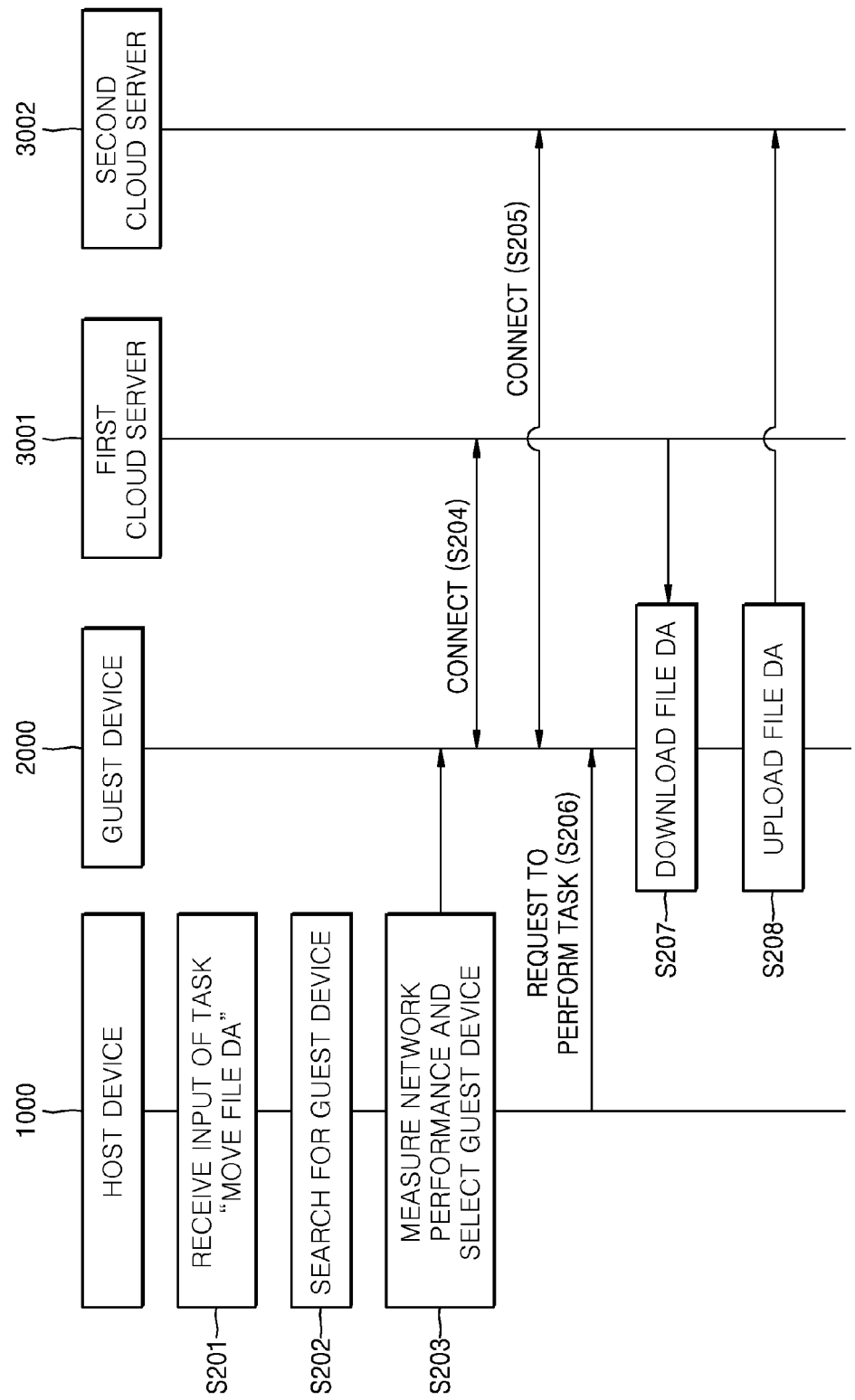
FIG. 4 is a flowchart illustrating the example method of FIG. 3.

FIG. 3 is a diagram illustrating an example method whereby the host device 1000 delegates a task for moving data between remote servers to a guest device, and FIG. 4 is a flowchart illustrating the method.

A remote task to be performed by the host device 1000 may, for example, be a task for moving a user's file "DA" stored in a first cloud server 3001 to a second cloud server 3002.

When a move task command is input to the host device 1000 (operation S201), the host device 1000 searches for the guest device 2000 (operation S202).

The host device 1000 measures network performances of the guest devices 2000 and selects the particular guest device 2000 to perform the task (operation S203). The host device 1000 may directly measure network performances of the guest devices 2000 or may request the guest devices 2000 to provide information regarding network performances of the guest devices 2000 to the host device 1000. The network performances of the guest devices 2000 may include network performances between the guest devices 2000 and the host device 1000 and network performances between the guest devices 2000 and the cloud servers 3001 and 3002, for example.

Furthermore, to measure network performances, the host device 1000 may request the guest devices 2000 to be connected to the first cloud server 3001 and the second cloud server 3002. After the guest devices 2000 are connected to the first cloud server 3001 and the second cloud server 3002 (operation S204) (operation S205), network performances are measured. The host device 1000 may receive information regarding network performances of the guest devices 2000 from the guest devices 2000. The host device 1000 may select the guest device 2000 with the better network performance from among the registered guest devices 2000, e.g., a first guest device 2001, to perform the task.

The host device 1000 requests the selected guest device 2000 to perform a task (operation S206). The guest device 2000 downloads the file "DA" from the first cloud server 3001 and uploads the same to the second cloud server 3002 based on a control signal from the host device 1000 (operation S208).

Although FIGS. 3 and 4 show that one guest device delegating performance of a task of the host device 1000, a plurality of guest devices may divide and perform the task.

Figure 5:
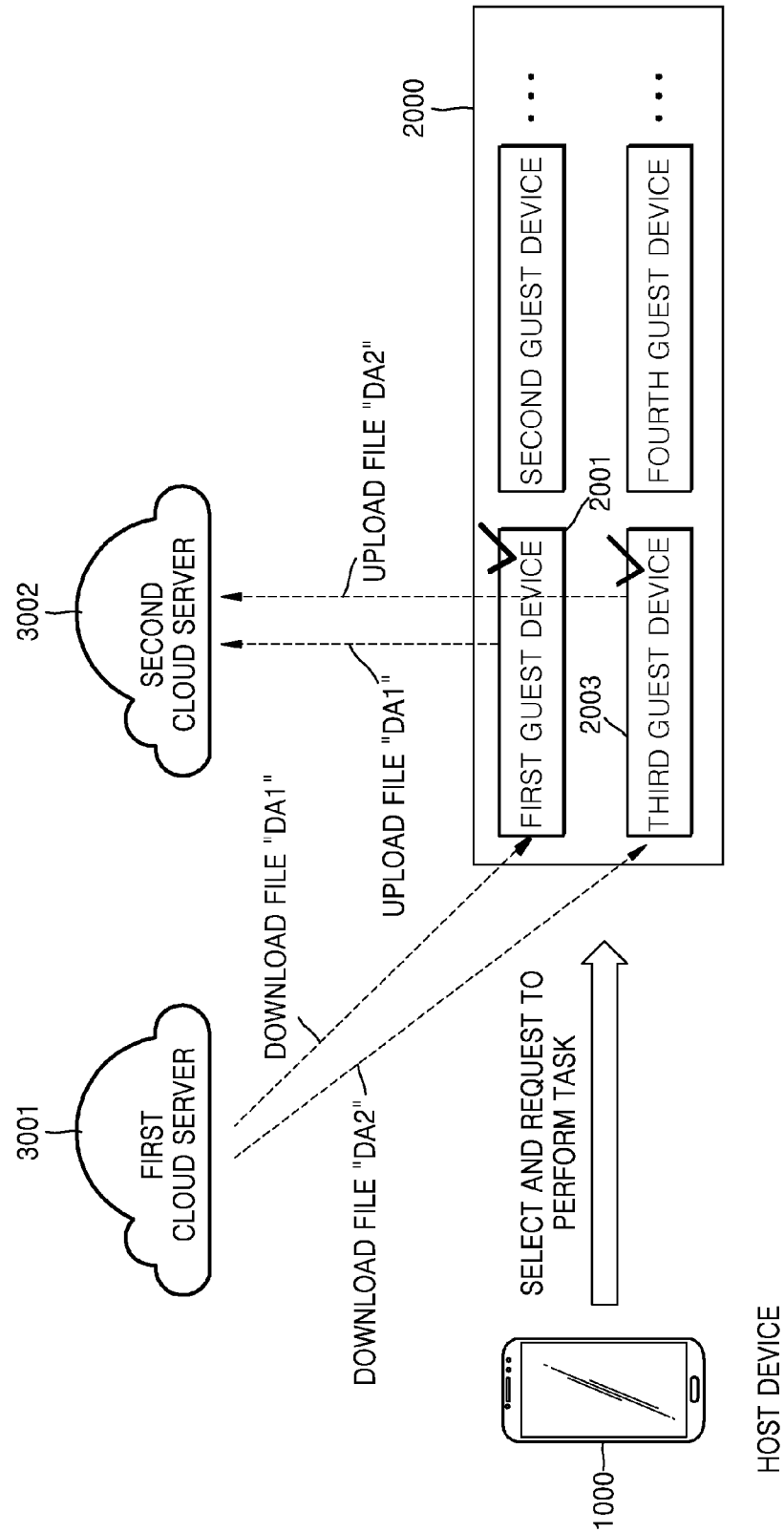
FIG. 5 is a diagram illustrating an example method whereby the host device delegates a task for moving data between remote servers to a plurality of guest devices.
Figure 6:
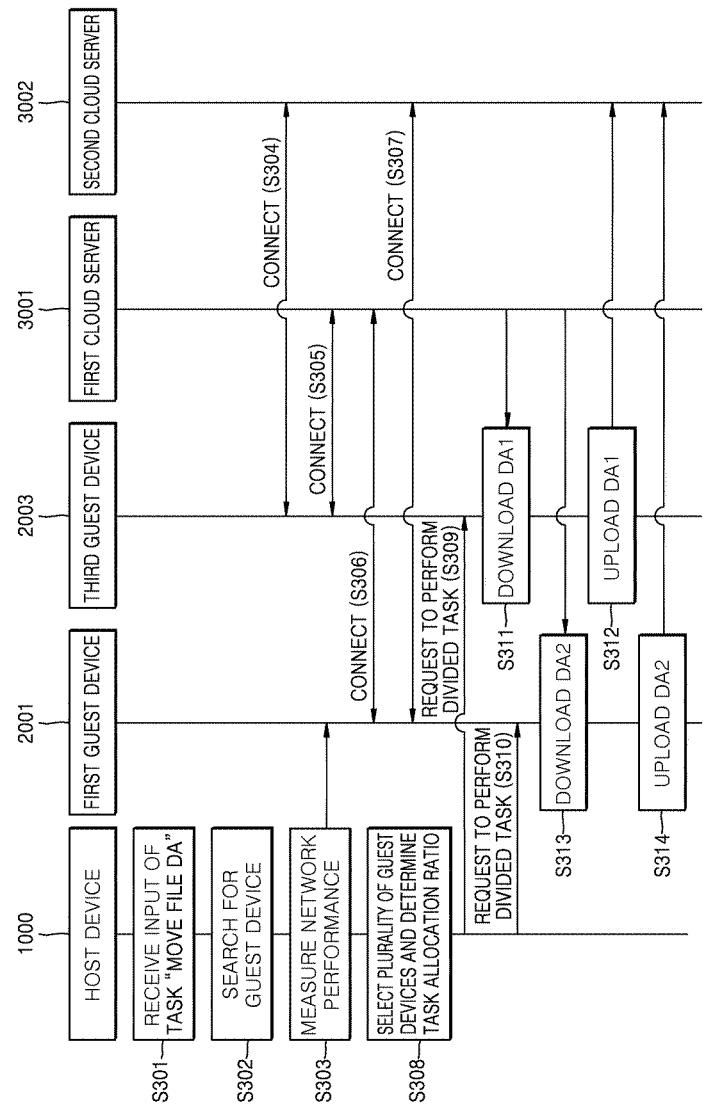
FIG. 6 is a flowchart illustrating the example method of FIG. 5.

FIG. 5 is a diagram illustrating an example method whereby the host device 1000 delegates a task for moving data between remote servers to a plurality of guest devices, and FIG. 6 is a flowchart illustrating the method.

When a move task command is input to the host device 1000 (operation S301), the host device 1000 searches for the guest device 2000 (operation S302).

The host device 1000 measures network performances of the guest devices 2000 (operation S303). To measure network performances, the host device 1000 may request the guest devices 2000 to be connected to the first cloud server 3001 and the second cloud server 3002. After the guest devices 2000 are connected to the first cloud server 3001 and the second cloud server 3002 (operation S304) (operation S305) (operation S306) (operation S307), network performances are measured (operation S303).

The host device 1000 selects a plurality of guest devices to perform a task from among the registered guest devices 2000 and determines a task allocation ratio (operation S308). For example, a plurality of guest devices with the better network performances, e.g., the first guest device 2001 and a third guest device 2003, may be selected to perform the task. In this case, the first guest device 2001 and the third guest device 2003 receive divided portions of the file, where dividing ratio of the file may be in proportional to network performances. For example, if network speed of the first guest device 2001 is 1 Mbps and network speed of the third guest device 2003 is 2 Mbps, the first guest device 2001 may perform a move task regarding a portion "DA1" corresponding to ⅓ of the file "DA," whereas the third guest device 2003 may perform a move task regarding a portion "DA2" corresponding to ⅔ of the file "DA." Alternatively, if network speed of the first guest device 2001 is identical to that of the third guest device 2003, a dividing ratio of the file "DA" may be 1:1. However, the dividing method as described above is merely an example, and the disclosure is not limited thereto.

Based on the determination, the host device 1000 requests the first guest device 2001 and the third guest device 2003 to perform tasks allocated thereto (operation S309) (operation S310). The first guest device 2001 downloads the portion "DA1" from the first cloud server 3001 and uploads the same to the second cloud server 3002, based on a control signal of the host device 1000. The third guest device 2003 downloads the portion "DA2" from the first cloud server 3001 and uploads the same to the second cloud server 3002, based on a control signal of the host device 1000. Furthermore, the second cloud server 3002 may combine the portion "DA1" received from the first guest device 2001 with the portion "DA2" received from the third guest device 2003. Furthermore, the second cloud server 3002 may store the file "DA" by combining the portion "DA1" with the portion "DA2."

Figure 7:
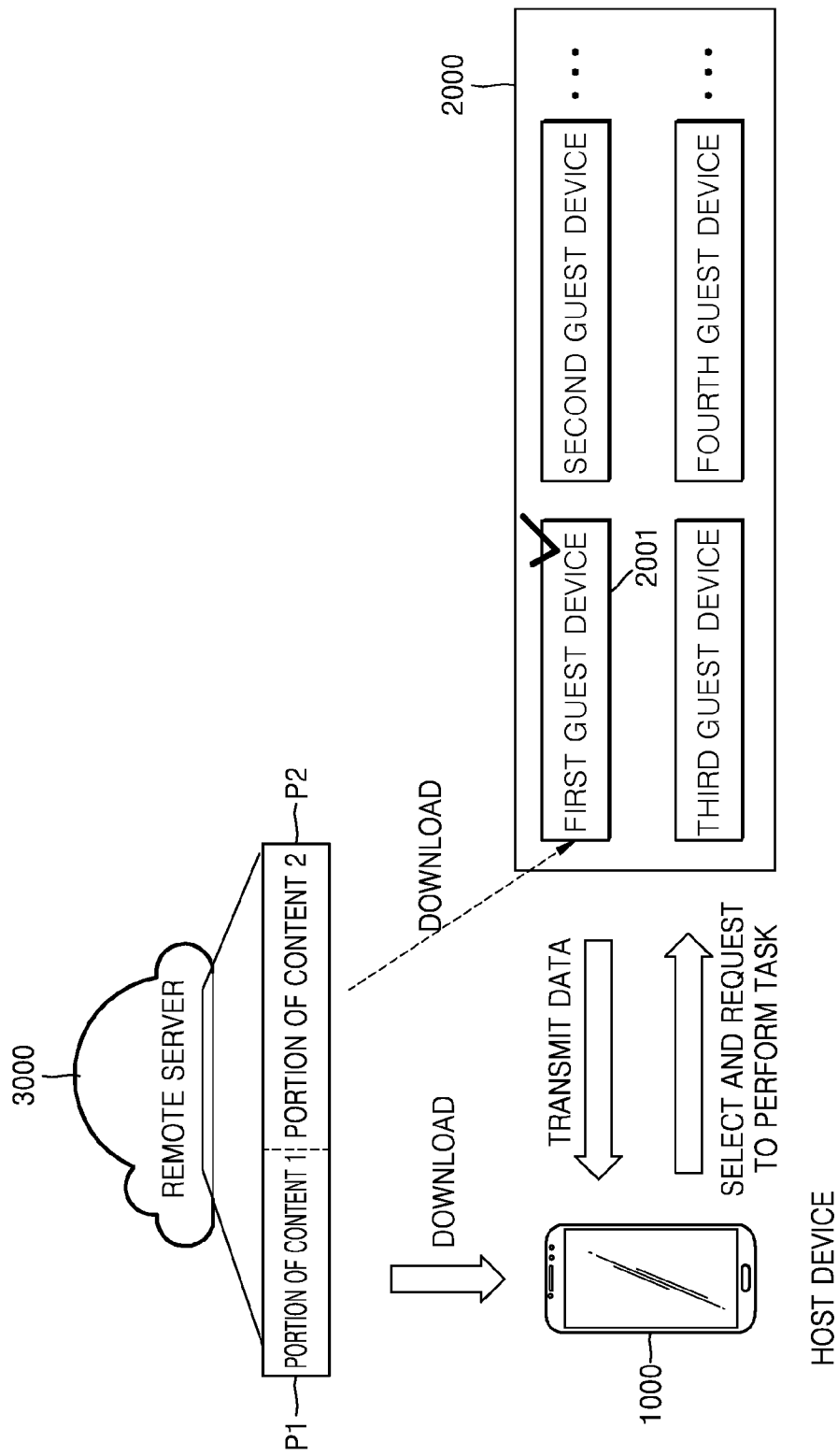
FIG. 7 is a diagram illustrating an example in which the host device divides a task for executing content stored in a remote server and performs divided tasks with a guest device.
Figure 8:
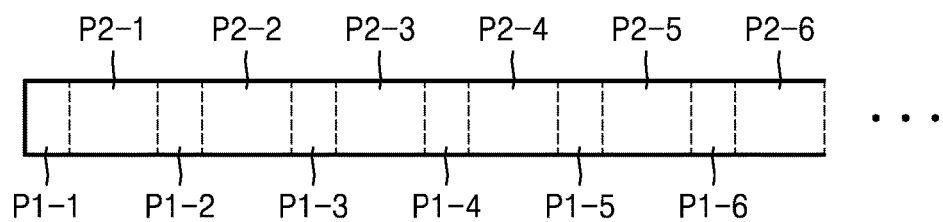
FIG. 8 is a diagram illustrating an example of dividing content stored in the remote server.
Figure 9:
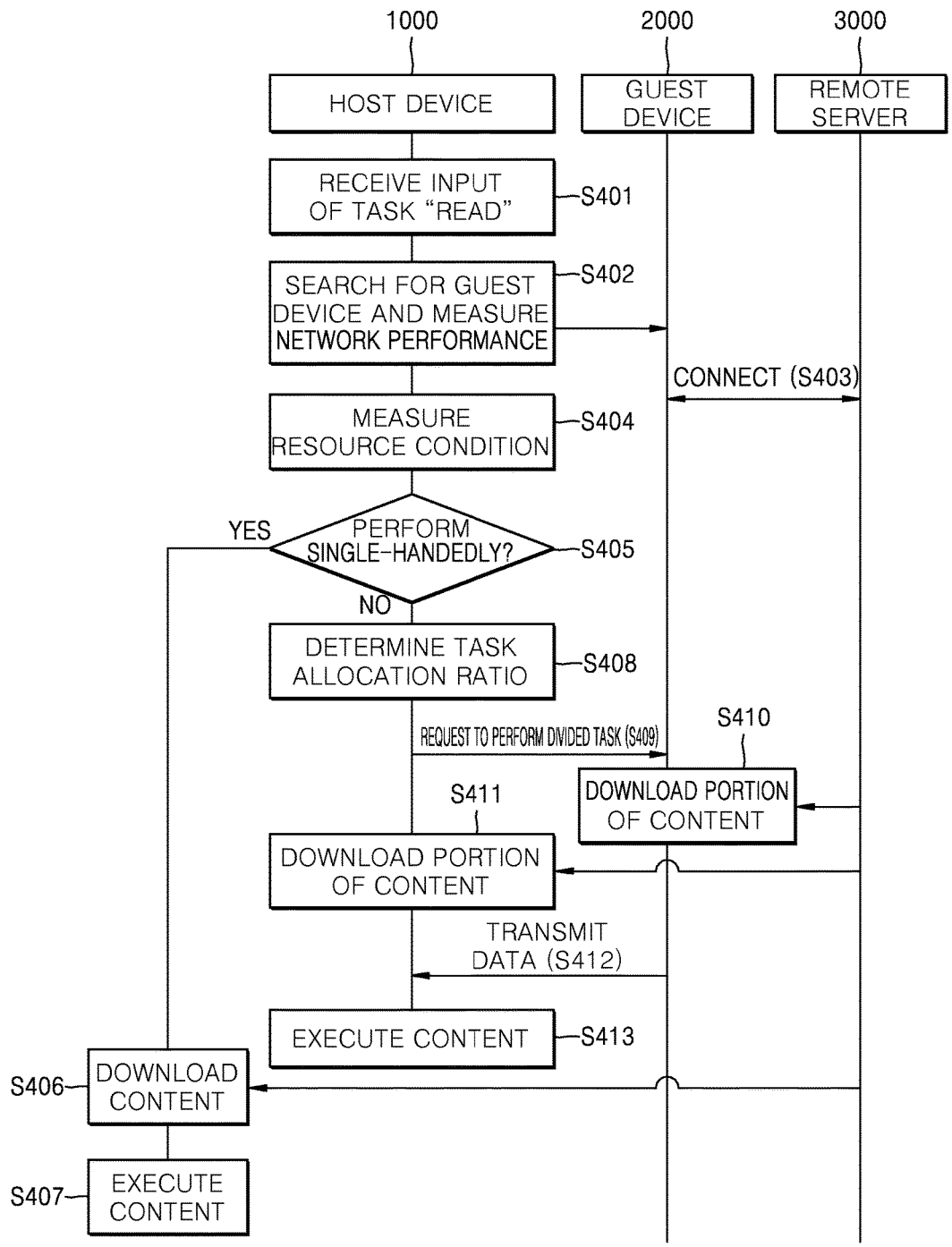
FIG. 9 is a flowchart illustrating the example method of FIG. 7.

FIG. 7 is a diagram illustrating an example in which the host device 1000 divides a task for executing content stored in a remote server and performs divided tasks with a guest device. FIG. 8 is a diagram illustrating an example of dividing content stored in the remote server 3000, and FIG. 9 is a flowchart illustrating the method of FIG. 7.

When, for example, a "Read" task is input to the host device 1000 (operation S401), the host device 1000 searches for a guest device and measures network performance (operation S402). To measure network performances, the host device 1000 may request the guest device 2000 to be connected to the remote server 3000 (operation S403).

The host device 1000 also measures resource conditions, such as a battery condition and a wireless data capacity (operation S404).

Based on results of the measurements, it is determined whether the host device 1000 should perform the task alone (i.e., single-handedly) (operation S405).

For example, it may be determined to perform a task alone (e.g., single-handedly) when there is no suitable guest device to divide and perform the task or when it is determined as more appropriate for the host device 1000 to single-handedly perform the task in consideration of network performances of the host device 1000 and the guest device 2000 and resources of the host device 1000. The host device 1000 downloads content stored in the remote server 3000 (operation S406) and executes the same (operation S407).

It may be determined that it is not appropriate to single-handedly perform the task. For example, to watch a moving picture stored in the remote server 3000 at the host device 1000, at least transmission speed of 2 Mbps is necessary for seamless reproduction of the moving picture, but a current network performance of the host device 1000 may, for example, allow a transmission speed up to 1 Mbps only. Incidentally, the guest devices 2000 may include a device with a network speed of 2 Mbps with respect to the remote server 3000 and a short-range network speed of 3 Mbps with respect to the host device 1000, and thus real time execution of the content may be guaranteed by utilizing the guest device 2000. A task allocation ratio between the host device 1000 and the guest device 2000 is determined in consideration of, for example, the above-stated conditions (operation S408). The task allocation ration may be determined in consideration of network performances, type of communication (via a wire/wireless), and resources of the host device 1000. For example, if network speed of the host device 1000 is slightly insufficient to guarantee real time execution, a ratio between a portion of the task allocated to the host device 1000 and a ratio of the task allocated to the guest device 2000 may be about 1:1. Alternatively, if the guest device 2000 is connected to a wired communication and exhibits superior network performance than that of the host device 1000, the task may be divided, such that the guest device 2000 performs most of the divided tasks.

After the task allocation ratio is determined, the host device 1000 request the guest device 2000 to perform the divided task (operation S409). The guest device 2000 downloads a portion of the content allocated thereto from the remote server 3000 (operation S410) and transmits the portion of the content to the host device 1000 (operation S412). The host device 1000 also downloads a portion of the content allocated thereto from the remote server 3000 (operation S411).

The host device 1000 executes the whole content generated by combining the portion of the content downloaded by the host device 1000 with the portions of the content received from the guest device 2000 (operation S413).

FIG. 8 is a diagram illustrating an example of dividing content stored in the remote server 3000. Based on types of 'execution' to be performed by the host device 1000, content in the remote server 3000 may be executed after being entirely downloaded by the host device 1000 or, like moving picture playback or music playback, the content may be executed via streaming without downloading the entire content. In this case, the entire content is divided by a suitable size, and the divided portions of content are alternately allocated to the host device 1000 and the guest device 2000 from the first divided portion. For example, portions P1-1, P1-2, P1-3, and so on are allocated to the host device 1000, whereas portions P2-1, P2-2, P2-3, and so on are allocated to the guest device 2000. A size ratio between P1-N (N=1, 2, 3, and so on) and P2-N (N=1, 2, 3, and so on) may be identical to the task allocation ratio determined in the operation S409 based on network performances of the host device 1000 and the guest device 2000. The host device 1000 executes the portions of content in real time as soon as the portions of content are transmitted to the host device 1000.

Although a case in which the host device 1000 and the one guest device 2000 divide and perform a task is described above, the host device 1000 and a plurality of guest devices 2000 may divide and perform a task.

Although the "Read" task is illustrated and described in the description above, the host device 1000 and the guest device 2000 may divide and perform a "Write" task in a similar regard.

FIG. 10 is a block diagram illustrating an example device 5000. The device 5000 shown in FIG. 10 may, for example, be the host device 1000 as described above in the example embodiments.

A mobile communication unit 1001 includes circuitry configured to exchange wireless signals with at least one of a station, an external terminal, and a server on a mobile communication network. Here, the wireless signals may include a voice call signal, a video call signal, or various types of data related to transmission and reception of text/multimedia messages.

A short-range communication unit 1002 includes communication circuitry configured to perform short-range wireless communication. The short-range communication unit 1002 may, for example, include a Bluetooth Low Energy (BLE) communication unit, a near field communication unit (NFC) communication unit, a Wi-Fi (WLAN) communication unit, a Zigbee communication unit, an infrared data association (IrDA) communication unit, a Wi-Fi Direct (WFD), an ultra wideband (UWB) communication unit, or an Ant+ communication unit. However, the disclosure is not limited thereto.

A broadcasting unit 1003 includes circuitry configured to receive DMB broadcasting signals.

A camera unit 1004 may, for example, include a lens and optical elements for picking up photographs or moving pictures.

A sensor unit 1005 may, for example, include various sensors, such as a gravity sensor for detecting movement of a device, an illumination sensor for detecting luminance, a proximity sensor for detecting proximity of a person, and a motion sensor for detecting a motion of a person.

A GPS reception unit 1006 includes circuitry configured to receive GPS signals from satellites. Various services may be provided to a user by using the GPS signals.

An input/output unit 1010 provides an interface with an external device or a person and includes a button 1011, a microphone 1012, a speaker 1013, a vibration motor 1014, a connector 1015, and a keypad 1016.

A touch screen 1018 receives a touch input from a user. A touch screen controller 1017 transfers a touch input received via the touch screen 1018 to a controller 1050. A power supply unit 1019 is connected to a battery or an external power source to supply necessary power to the device 5000.

The controller 1050 includes processing circuitry configured to execute programs stored in a memory 1060. For example, the controller 1050 utilizes a guest device to divide and perform a task with respect to a remote server as described above by executing a task division setup module 1073.

Programs stored in the memory 1060 may be categorized into a plurality of modules, e.g., a mobile communication module 1061, a Wi-Fi module 1062, a Bluetooth module 1063, a DMB module 1064, a camera module 1065, a sensor module 1066, a GPS module 1067, a moving picture reproducing module 1068, an audio reproducing module 1069, a power supply module 1070, a touch screen module 1071, an UI module 1072, and the task division setup module 1073. Since functions of each of the other modules may be inferred by one of ordinary skill in the art from names thereof, only the task division setup module 1073 will be described below.

The task division setup module 1073 is a module including hardware and/or software for dividing and performing a task with a guest device in consideration of various conditions including network performances when it is requested to perform the task with respect to a remote server. The task division setup module 1073 includes commands for executing an operation for receiving a task communication regarding a remote server; an operation for searching for guest devices capable of communicating with the remote server; determining a task performing pattern based on the found guest device and details of the task; and, based on the determined task performing pattern, performing the task single-handedly or together with one or more guest devices selected from the found guest devices.

A task command regarding the remote server may be input when a user executes various programs stored in the memory 1060. For example, a user may desire to execute a moving picture file or a music file via the moving picture reproducing module 1068 or the audio reproducing module 1069.

The task division setup module 1073 searches for guest devices capable of communicating with the remote server and capable of performing a short-range wireless communication with the device 5000, checks conditions thereof, and determines a task performing pattern.

To determine a task performing pattern, the task division setup module 1073 measures network performance of the device 5000, network performances of the respective found guest devices, and a resource condition of the device 5000 and considers results of the measurements and types of tasks to determine a task performing pattern.

A task performing pattern may be a pattern whereby the device 5000 single-handedly performs the task, a pattern whereby one or more of the guest devices from among the found guest devices 2000 perform the task in place of the host device, or a pattern whereby the device 5000 and one or more of the guest devices from among the found guest devices 2000 divide and perform the task.

If it is determined to divide and perform the task, a task allocation ratio between the device 5000 and the selected guest device is determined, where the task allocation ratio may, for example, be determined to be proportional to measured network performances.

Furthermore, the task division setup module 1073 may transmit signals for requesting to perform allocated portions to selected guest devices and receive results of performing the allocated portions of the task from the selected guest devices.

Although function of the task division setup module 1073 is briefly described for convenience of explanation, the disclosure is not limited thereto, and details of the functions of the task division setup module 1073 may be inferred from the descriptions given above with reference to FIGS. 1 to 9.

According to the above-stated method, a user may utilize various electronic devices via a host device, and thus various tasks with respect to a remote server may be smoothly and efficiently performed.

One or more example embodiments may be implemented by a non-transitory computer-readable recording medium, such as a program module executed by a computer. The non-transitory computer-readable recording medium may be an arbitrary available medium accessible by a computer, and examples thereof include all volatile media (e.g., RAM) and non-volatile media (e.g., ROM) and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically include a computer-readable command, a data structure, a program module, other data of a modulated data signal, or another transmission mechanism, and an example thereof includes an arbitrary information transmission medium. For example, the computer-readable recording medium may be a ROM, a RAM, a flash memory, a CD, a DVD, a magnetic disk, or a magnetic tape.

Furthermore, in the disclosure, the term "unit" may refer to a hardware component, such as a processor or a circuit, and/or a software component that is executed by a hardware component like a processor.

While the disclosure has been particularly shown and described with reference to example embodiments thereof, it will be understood by those of ordinary skill in the art that various changes in form and details may be made therein without departing from the spirit and scope of the disclosure as defined by the following claims. Hence, it will be understood that the example embodiments described above are not limiting the scope of the disclosure. For example, each component described in a single type may be executed in a distributed manner, and components described distributed may also be executed in an integrated form.

The scope of the disclosure is indicated by the claims which will be described in the following rather than the detailed description, and it should be understood that the claims and all modifications or modified forms drawn from the concept of the claims are included in the scope of the disclosure.

What is claimed is:

1. A method for a host device to access a remote server and perform a task, comprising:

receiving, by the host device, a task command for a task to be performed regarding the remote server;
after the host device receives the task command, searching for a guest device capable of performing the task and communicating with the remote server;
determining a task performing pattern based on one or more guest devices found by the searching and details of the task, wherein the task performing pattern comprises a pattern including one or more of: the host device performing the task itself; one or more of the found guest devices performing the task in place of the host device; and the host device and one or more of the found guest devices dividing and performing the task; and
allocating performing of the task with respect to the remote server to one or more devices selected from among the host device and the found guest devices, based on the task performing pattern,
wherein the guest device is one of a household electronic device, a wearable device, a television (TV), an illumination device, a refrigerator, an audio device, a washing machine, an oven, a gas range, a home gateway, a game device, an electronic blackboard, a touch table, and a wristwatch,
wherein determining the task performing pattern comprises:
measuring network performance of the host device;
measuring network performance of each found guest device;
selecting one or more found guest devices to which to allocate at least a portion of the task; and
determining a task allocation ratio between the host device and the selected guest devices, and
wherein the task allocation ratio between the host device and the selected guest device is determined to be proportional to the measured network performances of the host device and the selected guest devices.

2. The method of claim 1, wherein one or more of the guest devices is pre-registered with the host device.

3. The method of claim 1, wherein each guest device is configured for communicating with the remote server via wired communication and is configured for wirelessly communicating with the host device via short-range wireless communication.

4. The method of claim 1, wherein determining the task performing pattern further comprises determining a battery condition of the host device.

5. The method of claim 1, further comprising transmitting signals requesting the selected guest devices to perform portions of the task allocated thereto.

6. The method of claim 5, further comprising receiving results of performing the allocated portions of the task from the selected guest devices.

7. The method of claim 1, wherein the task comprises at least one of: uploading data from the host device to the remote server; downloading data from the remote server to the host device; moving data from the remote server to another remote server; and executing content stored in the remote server on the host device.

8. A host device comprising:
a memory, in which at least one program is stored; and
a processor configured to execute the at least one program to perform a task with respect to a remote server by utilizing a guest device,
wherein the at least one program, when executed, causes the host device to perform at least:
receiving a task command for a task to be performed regarding the remote server;
after receiving the task command, searching for a guest device capable of performing the task and communicating with the remote server;
determining a task performing pattern based on one or more guest devices found during the searching and details of the task, wherein the task performing pattern includes one or more of: the host device performing the task itself; one or more of the found guest devices performing the task in place of the host device; and the host device and one or more found guest devices dividing and performing the task; and
allocating performing of the task with respect to the remote server to one or more devices selected from among the host device and the found guest devices, based on the determined task performing pattern,
wherein the guest device is one of a household electronic device, a wearable device, a television (TV), an illumination device, a refrigerator, an audio device, a washing machine, an oven, a gas range, a home gateway, a game device, an electronic blackboard, a touch table, and a wristwatch,
wherein determining the task performing pattern comprises:
measuring network performance of the host device;
measuring network performance of each found guest device;
selecting one or more found guest devices to which to allocate at least a portion of the task; and
determining a task allocation ratio between the host device and the selected guest devices, and
wherein the task allocation ratio between the host device and the selected guest devices is determined to be proportional to the measured network performances of the host device and the selected guest devices.

9. The device of claim 8, wherein the at least one program further causes the host device to perform determining a battery condition of the device.

10. The device of claim 8, wherein the at least one program further causes the host device to perform transmitting signals requesting the selected guest devices to perform portions of the task allocated thereto.

11. The device of claim 10, wherein the at least one program further causes the host device to perform receiving results of performing the allocated portions of the task from the selected guest devices.

12. A non-transitory computer readable recording medium having recorded thereon a computer program which, when executed by a processor of a host device, causes to host device to at least:
receive a task command for a task to be performed regarding a remote server;
after receiving the task command, search for a guest device capable of performing the task and communicating with the remote server;
determine a task performing pattern based on one or more guest devices found by the search and details of the task, wherein the task performing pattern comprises a pattern including one or more of: the host device performing the task itself one or more of the found guest devices performing the task in place of the host device; and the host device and one or more of the found guest devices dividing and performing the task; and allocate performing of the task with respect to the remote server to one or more devices selected from among the host device and the found guest devices, based on the task performing pattern, wherein the guest device is one of a household electronic device, a wearable device, a television (TV), an illumination device, a refrigerator, an audio device, a washing machine, an oven, a gas range, a home gateway, a game device, an electronic blackboard, a touch table, and a wristwatch, wherein determining the task performing pattern comprises:
  measuring network performance of the host device;
  measuring network performance of each found guest device;
  selecting one or more found guest devices to which to allocate at least a portion of the task; and
  determining a task allocation ratio between the host device and the selected guest devices, and wherein the task allocation ratio between the host device and the selected guest devices is determined to be proportional to the measured network performances of the host device and the selected guest devices.

* * * * *